United States Patent Office 3,276,244
Patented Oct. 4, 1966

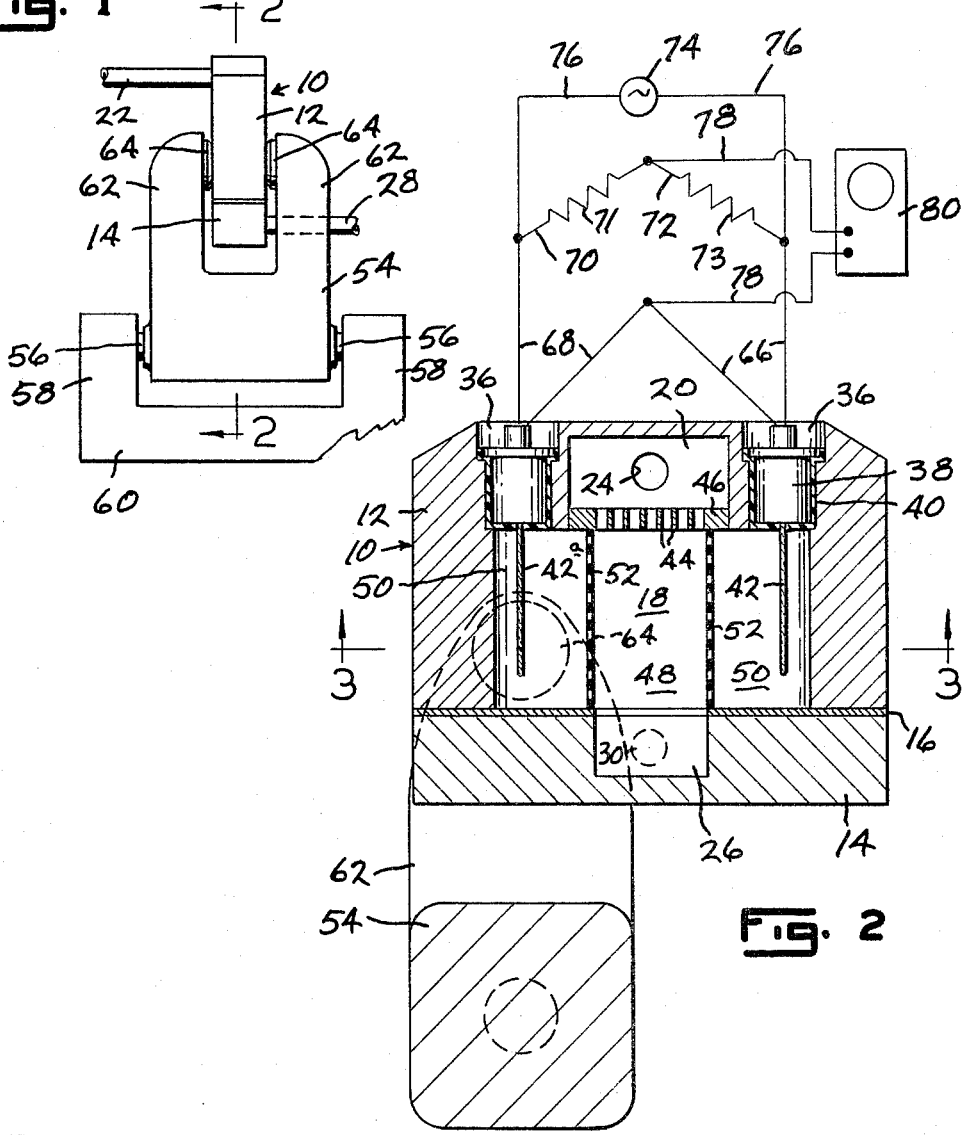
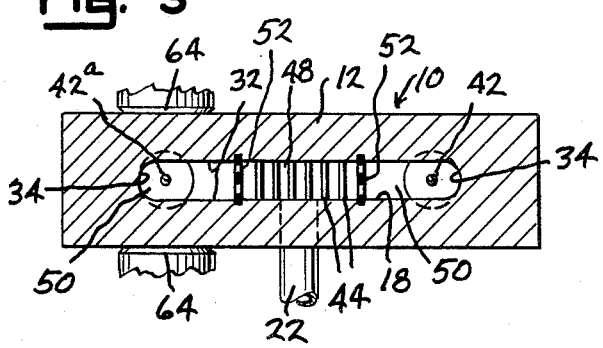
HUBERT DRECKMAN
CHARLES B. WILSON
WILLIAM S. DIXON
INVENTORS.
BY Eugene C. Knoblock
ATTORNEY

3,276,244
PARAMAGNETIC OXYGEN ANALYZER
MEASURING CELL
Charles B. Wilson, Michigan City, Ind., William S. Dixon, Houston, Tex., and Hubert Dreckman, Michigan City, Ind., assignors to The Hays Corporation, Michigan City, Ind., a corporation of Indiana
Filed Sept. 9, 1963, Ser. No. 307,690
8 Claims. (Cl. 73—27)

This invention relates to improvements in paramagnetic oxygen analyzer measuring cells.

Paramagnetic oxygen analyzers operate to measure the percentage of oxygen in a gas by comparing resistance changes in two similar electric heating elements caused by the magnetic wind to which one of the heating elements is subjected when it is placed in the field of a magnet. A device of this general character is shown in Richardson Patent No. 2,568,384, dated November 10, 1953.

The output signal of paramagnetic oxygen analyzer measuring cells is usually non-linear. The non-linear character of the output signal requires the use of special receivers which are trimmed to account for the non-linearity. It is the primary object of this invention to provide a paramagnetic oxygen analyzer measuring cell which is so designed that its output signal is linear so that it can be fed to any standard industrial electronic signal receiver.

A further object of the invention is to provide a paramagnetic oxygen analyzer cell which can produce a linear output signal as a result of the physical properties of the cell, selection of a magnetic field strength suitable for the range of the oxygen concentration in the gas sample being measured and adjustment of the voltage of the measuring circuit to which the cell is connected.

Paramagnetic oxygen analyzers are commonly used in conjunction with control systems which require that the measuring cell have a fast speed of response. The fluctuating sample flow rate as delivered by the sampling system requires insensitivity of the cell to large variations in the rate of flow of the sample gas. It is another object of this invention to provide a paramagnetic oxygen analyzer measuring cell which is substantially insensitive to wide variations of the flow of the sample gas and which utilizes a construction which produces good time and flow characteristics.

A further object is to provide a paramagnetic oxygen analyzer measuring cell wherein a large sample gas stream flows in a path adjacent a resistance heating elements so as to reduce the distance-velocity lag of the operation of the cell to a minimum.

A further object is to provide a device of this character wherein a cell containing spaced heating elements within a cavity thereof has reticulated members spanning the block cavity to separate the cavity into separate compartments, each receiving a heating element, and an intervening gas flow passage.

A further object is to provide a device of this character wherein flow sensitivity is reduced by directing the flow of gas in a predetermined path from which electric heating elements are protected by means of screens which limit gas access thereto from the main sample stream by a diffusing action.

Other objects will be apparent from the following specification.

In the drawing:

FIG. 1 is an end view of the device;

FIG. 2 is an enlarged vertical sectional view taken on line 2—2 of FIG. 1, and illustrating an electrical circuit with which the device is connected, and FIG. 3 is a transverse sectional view taken on line 3—3 of FIG. 2.

Referring to the drawing which illustrates the preferred embodiment of the invention, the numeral 10 designates a cell block which preferably is formed in two parts consisting of an upper part 12 and a lower part 14 which are suitably connected together by bolts or other securing means (not shown) and which may have a gasket 16 interposed therebetween. The cell block 10 is preferably formed of stainless steel although it may be formed of any other material found suitable. The upper part of the cell block has a narrow elongated cavity 18 therein which is open at its bottom and communicates at its center with a reduced inlet chamber 20 at its top. A gas supply line 22 communicates with the inlet chamber 20 at port 24 thereof. The bottom part 14 of the cell has an outlet chamber 26 therein which communicates with the cavity 18 centrally thereof. A gas discharge line 28 communicates with the outlet chamber at a port 30.

The cavity 18 is preferably of uniform size from its botom to its top, and preferably has substantially parallel side faces 32 and similar curved or rounded end surfaces 34.

A pair of openings 36 are formed in the upper part of the cell part 12 in symmetrical relation to and communicating with the cavity 18. A plug 38 is mounted in each opening 36 and preferably has a sealed fit therein, as by the use of a sheath 40 or other sealing means. Each plug 38 carries an electrical resistance element 42 projecting therefrom into the cavity 18 substantially centrally between the side walls 32 thereof and each spaced from the adjacent rounded end face of the cavity the same distance. The electric resistance elements preferably constitute elongated spirals of wire, such as platinum, which are covered with glass. One form of element which is particularly well suited is shown in Richardson Patent No. 2,686,245, dated August 10, 1954. The two electrical resistance elements 42 have similar physical dimensions and electrical characteristics. Thus the two units are of the same length and diameter and the same electrical resistance values. The resistance elements 42 extend for the major part of the vertical dimension of the cavity 18 but terminate spaced above the lower cell part 14. The mounting of the plugs 38 in the block is gas-tight so that ambient air or gas cannot enter the cavity 18 and gas cannot leak therefrom.

Means are provided between the inlet chamber 20 and the cavity 18 to direct or guide the flow of gas in predetermined paths. For this purpose a plurality of parallel vanes 44 preferably extending in a direction transverse of the block are positioned at the lower mouth or outlet of the inlet chamber 20. The vanes 44 are preferably vertical and parallel and are of substantial vertical dimension. If desired, the vanes 44 may constitute parts of a grille 46 mounted to span the lower part of the inlet chamber 20.

The cavity 18 of the cell block is divided into a central compartment 48 and two similar side or diffusion compartments 50 by means of two transverse vertical reticulated members or screens 52. The screens 52 are preferably of substantially uniform character throughout their full extent and are located outwardly or in laterally displaced position from the vanes 44 and are spaced apart a distance greater than the transverse dimension of the outlet chamber 26. The arrangement is such that normal flow of gas from the inlet chamber 20 will be directed by the vanes 44 to pass through the central cavity compartment 48 and into the outlet chamber 26. At the same time, however, the screens 52 permit gas to flow between the central cavity compartment 48 and the two side compartments 50 by a diffusing action.

Means is provided for producing a magnetic flux field in one of the compartments 50. Thus, as shown, a permanent magnet 54, preferably of U-shape, is pivotally supported at 56 upon parts 58 of a base or frame 60. The two arms 62 of the magnet are spaced apart to receive cell block 10 therebetween and preferably terminate in magnet poles 64 adjacent to or having only small clearance with opposite faces of the cell block 10. The magnet 54 is shiftable between the position as shown in FIGS. 1, 2 and 3 and a position rotated or swung approximately 90° so that the magnet poles 64 and the magnet arms 62 are clear of the block. The operative position of the magnet is that illustrated in the drawings and it will be seen that the magnet poles 64 are substantially centered relative to the electrical resistance element 42a at one side of the cavity; that is, a center line drawn between the centers of the magnet poles will pass through the electrical resistance element 42a at a point spaced above the bottom of the cavity and spaced below the top thereof. Thus the lower portion of the electrical resistance element 42a is located or positioned centrally of the magnetic field or flux flow path between the magnet poles 64.

The electrical resistance elements 42 and 42a are connected to a Wheatstone bridge circuit in which the resistance element 42 is connected in one leg 66 and the resistance element 42a is connected in a second leg 68. The Wheatstone bridge circuit is completed by the legs 70 and 72, each including a resistance or impedance element such as 71 and 73, respectively. The Wheatstone bridge is supplied with current from a source 74 by leads 76 connected to the Wheatstone bridge at the junction between leg 68 and 70 and the junction between legs 66 and 72. Leads 78 are connected to the Wheatstone bridge circuit at the other junctions thereof, that is, one is connected between the legs 70 and 72, and the other is connected between the legs 66 and 68. Leads 78 energize an amplifier (not shown) the output of which is fed into a measuring instrument 80 which may be a recorder or an indicator.

In the operation of the device, conduit 22 is connected to a gas supply source and gas flows freely through the measuring cell from the inlet port 24 to the outlet port 30 thereof. The electrical resistance elements are heated by the Wheatstone bridge current to a selected temperature, preferably in the order of 200° centigrade. A magnetic flux field is created in a compartment 50, as by positioning the magnet 54 as illustrated, so that the magnet poles 64 thereof are positioned at opposite sides of the cell block 10 and the resistance element 42a is located in substantially the center of the field of the magnet. It will be understood, however, that the device may be checked by swinging the magnet 54 to a position at which its magnet poles are spaced from the cell block, and at this time the electrical balance of the device, i.e., of the two resistance elements, can be checked by observing the reading of the measuring instrument 80 while gas flows through the cell and the resistance elements 42 and 42a are heated. After the system has been checked in this way, the magnet may be returned to the position illustrated, whereupon reading of the measuring instrument 80 will indicate the oxygen content of the gas when the measuring instrument 80 is calibrated suitably.

As gas enters the cell block 10 at the inlet port 24 and the inlet chamber 20, it is directed downwardly in substantially parallel vertical flow paths by the vanes 44 and passes through the cavity 18 to the outlet chamber 26 and the outlet port 30. Gas is permitted to diffuse from the central compartment 48 through the reticulated members or screens 52 into the diffusion compartments 50 where it flows past the heated electric resistance elements 42 and 42a, respectively. Chimney effects are developed in the diffusion chambers 50 around heated resistance members 42 and 42a, that is, the heating of the gas creates convection flow thereof along the electric resistance elements 42 and 42a. The gas flow produced by this chimney or convection effect, in association with heat radiation and heat conduction, serves to cool both of the electric resistance elements 42 and 42a. If the sample gas is completely free of oxygen, that is, is magnetically inert or is slightly diamagnetic, the electric resistance elements 42 and 42a will be cooled equally. The equal cooling effects produce equal resistance changes in the resistance elements 42 and 42a which cancel each other, leaving the Wheatstone bridge balanced.

If oxygen is contained in the gas sample an additional effect results. The oxygen renders the gas sample paramagnetic so that sample gas in one diffusion chamber 50 is attracted to the field of the magnet between the magnet poles 64 where it becomes heated by the resistance element 42a. As the gas becomes heated by element 42a, it loses its paramagnetism and is displaced or pushed out of the magnetic field by cool gas of high paramagnetism. The result is that the rate of gas flow past the electric resistance element 42a is greater than the rate of gas flow in the other diffusion chamber 50 containing the electric resistance element 42. This increased rate of gas flow is sometimes known as "magnetic wind." The magnetic wind causes greater cooling of the resistance element 42a than occurs at the resistance element 42 and correspondingly changes the resistance value of the resistance element 42a compared to the change of resistance value of resistance element 42. The difference in resistances of the two resistance elements 42 and 42a unbalances the Wheatstone bridge, and this unbalance is proportional to the oxygen content of the sample gas.

The output signal of paramagnetic oxygen measuring cells employing the above principle is usually non linear. Thus it has been necessary heretofore to provide special receivers which are trimmed to compensate for the nonlinearity of the output signal. We have found that the cell described above, when operated properly, will produce a linear output signal. The only requirements necessary to accomplish this purpose are selection of optimum bridge voltage and selection of the magnetic field strength produced by the magnet 54 suitable for the concentration of oxygen in the gas sample. In other words, we have found that the concentration of magnetic field must be greater when the device is used to measure gas samples having low oxygen concentrations than is necessary when the gas contains a high concentration of oxygen. We prefer to use a magnet which will produce a magnetic field strength in the order of 4300 to 5300 gauss for the measurement of gas having an oxygen concentration up to 25%, and to use a magnet having a field strength in the order of 2200 to 3000 gauss for measuring gas samples having oxygen concentrations from 25% to 100%. It will be understood that these magnet characteristics are cited as illustrative and are not intended to be limiting, in that a fairly wide range of choice of magnetic field strength may be had without sacrifice of the functioning of the device. The same situation applies with reference to bridge voltage. Thus we prefer to use a bridge voltage of 11 to 14 volts, but it is understood that this depends upon the components of the circuits and hence is illustrative and is not intended to be limiting.

It will be understood that the output signal of the device taken off at the leads 78 may be utilized for control purposes by connection with suitable control apparatus. Control systems usually require a fast speed of response to variations in gas concentration, but at the same time should be insensitive to wide variations in the rate of flow of the gas sample. Since speed of response and flow sensitivity are closely related in considering the design of a measuring cell, it is usually possible to reduce response time by tightening or controlling the flow specifications. Flow sensitivity can usually be improved at the expense of the rapidity of response. The instant design of measuring cell provides good flow characteristics and adequate speed of response for most control systems.

The characteristics of the cell which make it well suited for the requirements of control systems include the fact that the cell permits a relatively large sample of gas to pass directly through the cell from the inlet port to the outlet port in a path close to the resistance elements 42 and 42a. Thus the diffusion of gas into the diffusion chambers 50 from the main stream so as to act upon the electric resistance elements 42 and 42a is very small because of the short distance involved. We have found in most instances that the lag of response of the cell to variations in oxygen content of the gas sample resulting from the distance of the resistance elements from the main flow path of the gas can be held to less than one second.

Another important characteristic of the device is that the gas exchange between the main gas stream flowing through the central cavity compartment 48 and the diffusion chamber 50 is subject only to a negligible retardation by the screens 52. The rapidity of this gas exchange is also enchanced by the convection flow occurring within the diffusion chambers 50. The time necessary for the gas exchange determines the time constant of the measuring cell (63% time). We have found that because of the large screen area through which the gas exchange takes place between chambers 48 and 50, and the small distance between the main gas stream and the resistance elements 42 in the present design, the time constant can be reduced to less than ten seconds.

Another important characteristic of the device is that its design reduces flow sensitivity. This results from the fact that the main gas stream from the inlet port 24 to the outlet port 30 is guided by the vanes 44 to produce laminar flow through the central cavity compartment 48 substantially parallel to the screens 52. Of equal importance to reduction of flow sensitivity of the cell is the fact that the electric resistance elements 42 and 42a are protected by the screens 52 from direct exposure to the main sample stream passing through the central cavity compartment 48. Thus we have found that, in a device of the construction described, it is possible to change the rate of flow of the gas sample through the cell from zero to three CFH without affecting the output signal of the cell.

While the preferred embodiment of the invention has been illustrated and described, it will be understood that changes in the construction may be made within the scope of the appended claims without departing from the spirit of the invention.

We claim:

1. A paramagnetic oxygen analyzer measuring cell, comprising
a block having a cavity open at an inlet and an outlet and defining a gas flow path through said block,
said cavity having similar lateral portions, symmetrically arranged and offset relative to said gas flow path,
a pair of similar elongated electric resistance members arranged similarly in said lateral cavity offsets in parallel relation to said gas flow path and spaced therefrom, and
similar reticulated partitions parallel to said gas flow path and separating said lateral cavity offsets from the central portion of said cavity
and means for producing a magnetic flux field in one of said lateral cavity portions and intersected by the resistance member therein.

2. A paramagnetic oxygen analyzer measuring cell, comprising
a block having a cavity and spaced inlet and outlet ports communicating with opposite ends of said cavity,
said cavity having a portion of substantially uniform cross-sectional dimension,
a pair of spaced similar reticulated members spanning said last named cavity portion to divide the same into a central gas flow compartment interposed between said inlet and outlet and a pair of similar diffusion chambers, and
an elongated electric resistance element positioned in each diffusion chamber,
said resistance elements having similar properties and being similarly positioned in said diffusion chambers in parallel relation to each other and to said reticulated members,
and means for producing a magnetic flux field in one of said lateral cavity portions and intersected by the resistance member therein.

3. A paramagnetic oxygen analyzer measuring cell, comprising
a block having a gas flow passage therethrough,
said passage having similar lateral enlargements intermediate its ends,
a pair of similar elongated electric resistance members, and
a pair of similar reticulated members separating said lateral enlargements from the remainder of said passage to define a pair of similar diffusion chambers,
each resistance member being mounted within a diffusion chamber in a predetermined position parallel to said reticulated members and to each other, and means for producing a magnetic flux field in one diffusion chamber and intersected by the resistance member therein, said means having a flux field strength within one of two predetermined ranges of flux values, said strength being high for measurement of gas having a low percentage of oxygen concentration and being low for measurement of gas having a high percentage of oxygen concentration and selected to produce a measurement signal substantially linearly responsive to the oxygen content of the gas being measured.

4. A paramagnetic oxygen analyzer measuring cell as defined in claim 3, wherein
said diffusion chambers are vertically elongated and of part-cylindrical cross-sectional shape, and
said resistance elements are elongated and extend vertically for the major portion of the height of said diffusion chambers in substantially similar relation to said part-cylindrical chamber portions.

5. A paramagnetic oxygen analyzer measuring cell, comprising
a block having a gas flow passage therethrough,
said passage having similar lateral enlargements intermediate its ends,
a pair of similar elongated electric resistance members,
a pair of similar reticulated members separating said lateral enlargements from the remainder of said passage to define a pair of similar diffusion chambers,
each resistance member being mounted within a diffusion chamber in a predetermined position parallel to the other resistance member and to said reticulated members, and
means for directing gas flow in said passage between said reticulated members said resistance members being connected in a bridge circuit, and means for producing a magnetic flux field in one of said lateral cavity portions and intersected by the resistance member therein, said flux field strength being so correlated with the physical dimensions of the cell block and the voltage applied to the flux intersecting resistance element as to produce a linear function between the oxygen concentration of the gas being measured and the electrical output of the bridge circuit.

6. A paramagnetic oxygen analyzer measuring cell, comprising
a block having a gas flow passage therethrough,
said passage having similar lateral enlargements intermediate its ends,
a pair of similar elongated electric resistance members,
a pair of similar reticulated members separating said lateral enlargements from the remainder of said passage to define a pair of similar diffusion chambers, each resistance member being mounted within a diffusion chamber in a predetermined position parallel to said reticulated members, and a plurality of spaced vanes in said passage adjacent to the inlet thereof for directing gas flow in streams substantially parallel to and between said reticulated members and said resistance members, and means for producing a magnetic flux field in one of said lateral cavity portions and intersected by the resistance member therein.

7. A paramagnetic oxygen analyzer measuring cell, comprising a multiple part cell, an upper part having a vertical passage portion of uniform cross-sectional size defined by substantially parallel opposed side walls and similar curved end walls and a reduced dimension centrally positioned inlet at its upper end, a lower cell part having an outlet communicating with the central portion of the lower end of said passage, a pair of similar vertical screens spanning said passage outwardly offset from said inlet and said outlet and in equally spaced relation to said curved end walls to define a pair of similar elongated diffusion chambers, and a pair of elongated electric resistance elements positioned in substantially similar spaced relation to said curved walls in said respective diffusion chambers and parallel to said screens and to each other.

8. A paramagnetic oxygen analyzer measuring cell, comprising a multiple part cell, an upper cell part having a vertical passage portion of uniform cross-sectional size defined by substantially parallel opposed side walls and similar curved end walls and a reduced dimension centrally positioned inlet at its upper end, a lower cell part having an outlet communicating with the central portion of the lower end of said passage, a pair of similar vertical screens spanning said passage in equally spaced relation to said curved end walls and laterally of said inlet and outlet to define a pair of similar diffusion chambers, an elongated electric resistance element positioned in substantially the same relation to the curved wall in each diffusion chamber, and vanes vertically directing gas flow from said inlet to said passage.

References Cited by the Examiner

UNITED STATES PATENTS

| 2,585,959 | 2/1952 | Minter | 73—27 |
| 2,603,964 | 7/1952 | Foley et al. | |
| 2,951,359 | 9/1960 | Kurpp | 73—27.5 X |
| 3,045,474 | 7/1962 | Ebbinghaus | 73—27 |

FOREIGN PATENTS

| 802,954 | 2/1955 | Germany. |

RICHARD C. QUEISSER, *Primary Examiner.*